(12) United States Patent
Suyama et al.

(10) Patent No.: US 10,456,973 B2
(45) Date of Patent: Oct. 29, 2019

(54) BLOW MOLDING APPARATUS AND BLOW MOLDING METHOD

(71) Applicants: Kenichi Suyama, Tokyo (JP); Mitsuru Shiokawa, Tokyo (JP); Shinichi Tabata, Tokyo (JP)

(72) Inventors: Kenichi Suyama, Tokyo (JP); Mitsuru Shiokawa, Tokyo (JP); Shinichi Tabata, Tokyo (JP)

(73) Assignee: DISCMA AG, Hunenberg (CH)

( * ) Notice: Subject to any disclaimer, the term of this patent is extended or adjusted under 35 U.S.C. 154(b) by 123 days.

(21) Appl. No.: 15/115,847

(22) PCT Filed: Nov. 17, 2014

(86) PCT No.: PCT/JP2014/005759
§ 371 (c)(1),
(2) Date: Aug. 1, 2016

(87) PCT Pub. No.: WO2015/114705
PCT Pub. Date: Aug. 6, 2015

(65) Prior Publication Data
US 2017/0008216 A1 Jan. 12, 2017

(30) Foreign Application Priority Data
Jan. 30, 2014 (JP) ................................ 2014-015775

(51) Int. Cl.
*B29C 49/46* (2006.01)
*B29C 49/78* (2006.01)
(Continued)

(52) U.S. Cl.
CPC ............ *B29C 49/783* (2013.01); *B29C 49/06* (2013.01); *B29C 49/12* (2013.01); *B29C 49/46* (2013.01);
(Continued)

(58) Field of Classification Search
None
See application file for complete search history.

(56) References Cited

U.S. PATENT DOCUMENTS

2006/0124269 A1* 6/2006 Miyazaki ............... B22D 17/04
164/316
2011/0135778 A1* 6/2011 Andison ................. B29C 49/46
425/524

FOREIGN PATENT DOCUMENTS

| JP | 2013-208834 A | 10/2013 |
| JP | 2013-541448 A | 11/2013 |
| JP | 2014-008636 A | 1/2014 |

OTHER PUBLICATIONS

Feb. 10, 2015 International Search Report issued in International Patent Application No. PCT/JP2014/005759.
(Continued)

*Primary Examiner* — Monica A Huson
(74) *Attorney, Agent, or Firm* — Oliff PLC

(57) ABSTRACT

A blow molding apparatus that supplies a pressurized liquid into a bottomed tubular preform fitted to a mold used for blow molding and molds the preform into a shape conforming to a cavity of the mold, the blow molding apparatus including: a blow nozzle fitted to a mouth tubular portion of the preform; a plunger pump configured to supply the pressurized liquid into the preform through the blow nozzle; and a control device configured to change an actuation rate and an actuation force of the plunger pump during the supply of the pressurized liquid into the preform to regulate a peak pressure of the liquid supplied into the preform to be from 3.5 MPa to 5.0 MPa.

8 Claims, 9 Drawing Sheets

(51) Int. Cl.
*B29C 49/06* (2006.01)
*B29C 49/12* (2006.01)
*B29C 49/08* (2006.01)
*B29L 31/00* (2006.01)

(52) U.S. Cl.
CPC ........ *B29C 49/08* (2013.01); *B29C 2049/129* (2013.01); *B29C 2049/4664* (2013.01); *B29C 2949/78537* (2013.01); *B29L 2031/7158* (2013.01)

(56) References Cited

OTHER PUBLICATIONS

Feb. 10, 2015 Written Opinion of the International Searching Authority issued in International Patent Application No. PCT/JP2014/005759.

\* cited by examiner

FIG 6
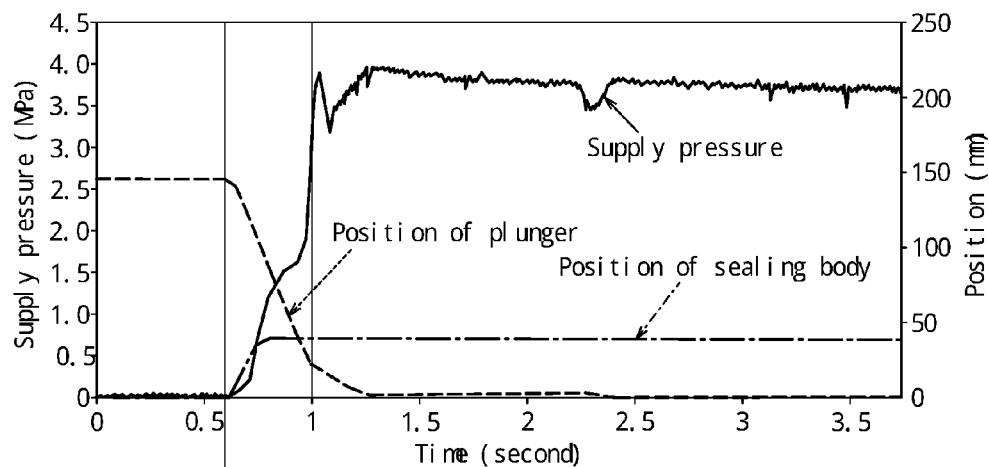
Present disclosure
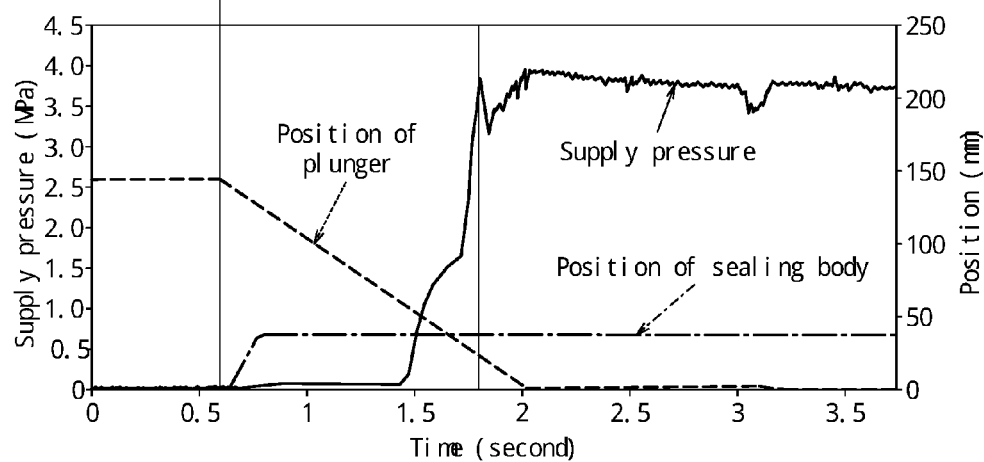
Comparison Example

FIG. 8

| | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Rate of servo motor (rpm) | 3000 | 3000 | 3000 | 3000 | 3000 | 3000 | 1250 | 3000 |
| Plunger torque (N·m) | 45 | 45 | 45 | 45 | 45 | 45 | 36.9 | 45 |
| Time period before change (sec) | 0.228 | 0.222 | 0.241 | 0.205 | 0.180 | 0.170 | – | – |
| Rate of servo motor (rpm) | 1250 | 1250 | 1250 | 1250 | 1250 | 1250 | 1250 | 3000 |
| Plunger torque (N·m) | 36.9 | 36.9 | 36.9 | 36.9 | 36.9 | 36.9 | 36.9 | 45 |
| Peak pressure (MPa) | 4.0 | 3.5 | 5.0 | 3.0 | 2.5 | 2.2 | 4.0 | 10.0 or more |
| Pressurization time period (sec) | 0.27 | 0.27 | 0.27 | 0.27 | 0.27 | 0.27 | 1.00 | 0.25 |
| Immediately-after bottle capacity (ml) | 505.8 | 505.9 | 505.9 | 504.8 | 504.3 | 502.4 | 459.7 | – |
| One-day-after bottle capacity (ml) | 493.9 | 492.8 | 494.2 | 491.9 | 491.4 | 490.2 | 429.7 | – |
| Shrinkage rate (%) | 2.3 | 2.3 | 2.3 | 2.4 | 2.4 | 2.6 | 6.1 | – |

BLOW MOLDING APPARATUS AND BLOW MOLDING METHOD

TECHNICAL FIELD

The present disclosure relates to a blow molding apparatus and a blow molding method by which a bottomed tubular preform is blow molded into a bottle, and especially to such an apparatus and a method that use a liquid as a pressurized fluid used for blow molding.

BACKGROUND

Resin bottles, representatives of which are oriented poly-polypropylene (OPP) bottles and poly-ethylene terephthalate (PET) bottles, are used in various fields, such as beverages, foods, cosmetics, and so forth. Such a bottle is typically formed in a predetermined shape by biaxially stretch blow molding a resin preform by using a blow molding apparatus in a state where the resin preform is heated to a temperature at which a stretching effect may be achieved. The resin preform has been formed in a bottomed tubular shape by, for example, injection molding.

Known examples of such a blow molding apparatus include the one that uses a pressurized liquid, instead of pressurized air, as the pressurized fluid that is supplied into the preform. As the liquid used in this example, a content liquid, such as a beverage, a cosmetic product, a pharmaceutical product, or the like, that is to be filled into the bottle as a final product may be used. By doing so, the process of filling the content liquid to the bottle may be omitted, and the production process and the configuration of the blow molding apparatus may be simplified.

For example, Patent Literature 1 describes a blow molding apparatus including a blow molding mold to which a preform, after heated to a temperature at which the preform is stretchable, is fitted, a blow nozzle that is fitted to a mouth tubular portion of the preform fitted to the mold, a pressurized liquid supply unit configured to supply a pressurized liquid into the preform through the blow nozzle, and a stretching rod that is freely displaceable in upward and downward directions. By stretching the preform in the longitudinal (axial) direction by the stretching rod and also by stretching the preform in the lateral (radial) direction by supplying the pressurized liquid into the preform, the preform is molded into a bottle having a shape conforming to a cavity of the mold.

CITATION LIST

Patent Literature

PTL1: JP2013208834A

SUMMARY

Technical Problem

The blow molding apparatus, in which the content liquid to be filled to the bottle as a final product is used as the pressurized fluid supplied into the preform, may employ a servo plunger-type plunger pump driven by an electric motor as the pressurized liquid supply unit configured to supply the pressurized content liquid. Using the plunger pump as the pressurized liquid supply unit allows a metered amount of the content liquid to be filled into the final bottle with high precision.

However, to increase moldability of the preform, the liquid supplied into the preform needs to be pressurized to a prescribed pressure within a short time period, and accordingly, an actuation rate of the preform plunger pump is increased. In reaction to this, a water hammer phenomenon (i.e., a fluid hammer effect) might occur during the supply of the pressurized liquid into the preform. When the water hammer phenomenon occurs, the peak pressure of the liquid supplied into the preform reaches, for example, approximately 10 MPa, which is significantly higher than the prescribed pressure and might cause deterioration in moldability of the preform and stability of blow molding.

The present disclosure has been conceived in light of the above problem, and the present disclosure is to provide a blow molding apparatus and a blow molding method both of which enhance moldability of the preform and stability of blow molding by accelerating pressurization of the liquid while preventing the water hammer phenomenon occurring in reaction thereto.

Solution to Problem

One of aspects of the present disclosure resides in a blow molding apparatus that supplies a pressurized liquid into a bottomed tubular preform fitted to a mold used for blow molding and molds the preform into a shape conforming to a cavity of the mold, the blow molding apparatus including: a blow nozzle fitted to a mouth tubular portion of the preform; a plunger pump configured to supply the pressurized liquid into the preform through the blow nozzle; and a controller configured to change an actuation rate and an actuation force of the plunger pump during the supply of the pressurized liquid into the preform to regulate a peak pressure of the liquid supplied into the preform to be from 3.5 MPa to 5.0 MPa.

In a preferred embodiment of the blow molding apparatus according to the present disclosure, upon an elapse of a predetermined time period from a start of the supply of the pressurized liquid into the preform, the controller changes the actuation rate and the actuation force of the plunger pump to values that are lower than those before the elapse of the predetermined time period.

In another preferred embodiment of the blow molding apparatus according to the present disclosure, the plunger pump includes a servo plunger-type pump configured to be driven by an electric motor as a driving source, and the controller changes the actuation rate and the actuation force of the plunger pump by varying a rotation rate and torque of the electric motor.

In yet another preferred embodiment of the blow molding apparatus according to the present disclosure, the blow molding apparatus further includes: a sealing body configured to open and close the blow nozzle, wherein the pressurized liquid is started to be supplied from the plunger pump into the preform upon a start of an opening movement of the sealing body.

Another aspect of the present disclosure resides in a blow molding method of supplying a pressurized liquid into a bottomed tubular preform fitted to a mold used for blow molding and molding the preform into a shape conforming to a cavity of the mold, the blow molding method including: the liquid supply step of supplying a pressurized liquid into the preform through a blow nozzle fitted to a mouth tubular portion of the preform by using a plunger pump; and the peak pressure control step of changing an actuation rate and an actuation force of the plunger pump during the supply of the pressurized liquid into the preform to regulate a peak pressure of the liquid supplied into the preform to be from 3.5 MPa to 5.0 MPa.

In a preferred embodiment of the blow molding method according to the present disclosure, in the peak pressure control step, upon an elapse of a predetermined time period from a start of the supply of the pressurized liquid into the preform, the actuation rate and the actuation force of the plunger pump are changed to values that are lower than those before the elapse of the predetermined time period.

Advantageous Effect

According to the present disclosure, by changing the actuation rate and the actuation force of the plunger pump during the supply of the pressurized liquid into the preform, an increase in pressure of the liquid due to the water hammer phenomenon is prevented, and the peak pressure of the liquid supplied into the preform is regulated to be from 3.5 MPa to 5.0 MPa. Consequently, pressurization of the liquid supplied into the preform is accelerated, and the water hammer phenomenon occurring in reaction thereto is prevented, and thus, moldability of the preform and stability of blow molding are enhanced.

BRIEF DESCRIPTION OF THE DRAWINGS

In the accompanying drawings:

FIG. 6 illustrates comparison between a time chart of a blow molding apparatus illustrated in FIG. 1 and a time chart of a blow molding apparatus of Comparative Example;

FIG. 8 illustrates results of comparison of Examples 1 to 3 and Comparative Examples 1 to 5.

DETAILED DESCRIPTION

Figure 1:
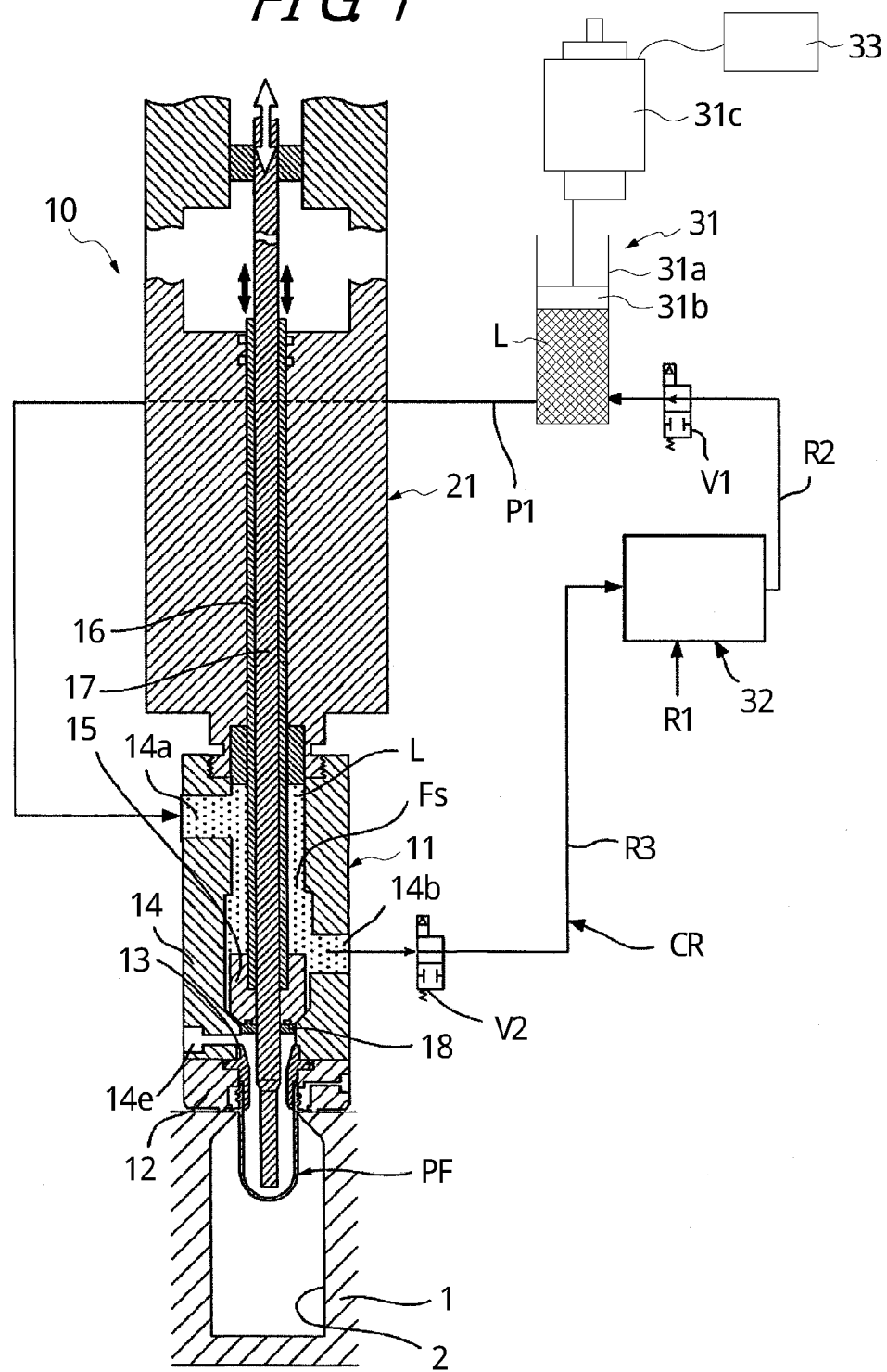
FIG. 1 schematically illustrates a blow molding apparatus according to one of embodiments of the present disclosure.
Figure 2:
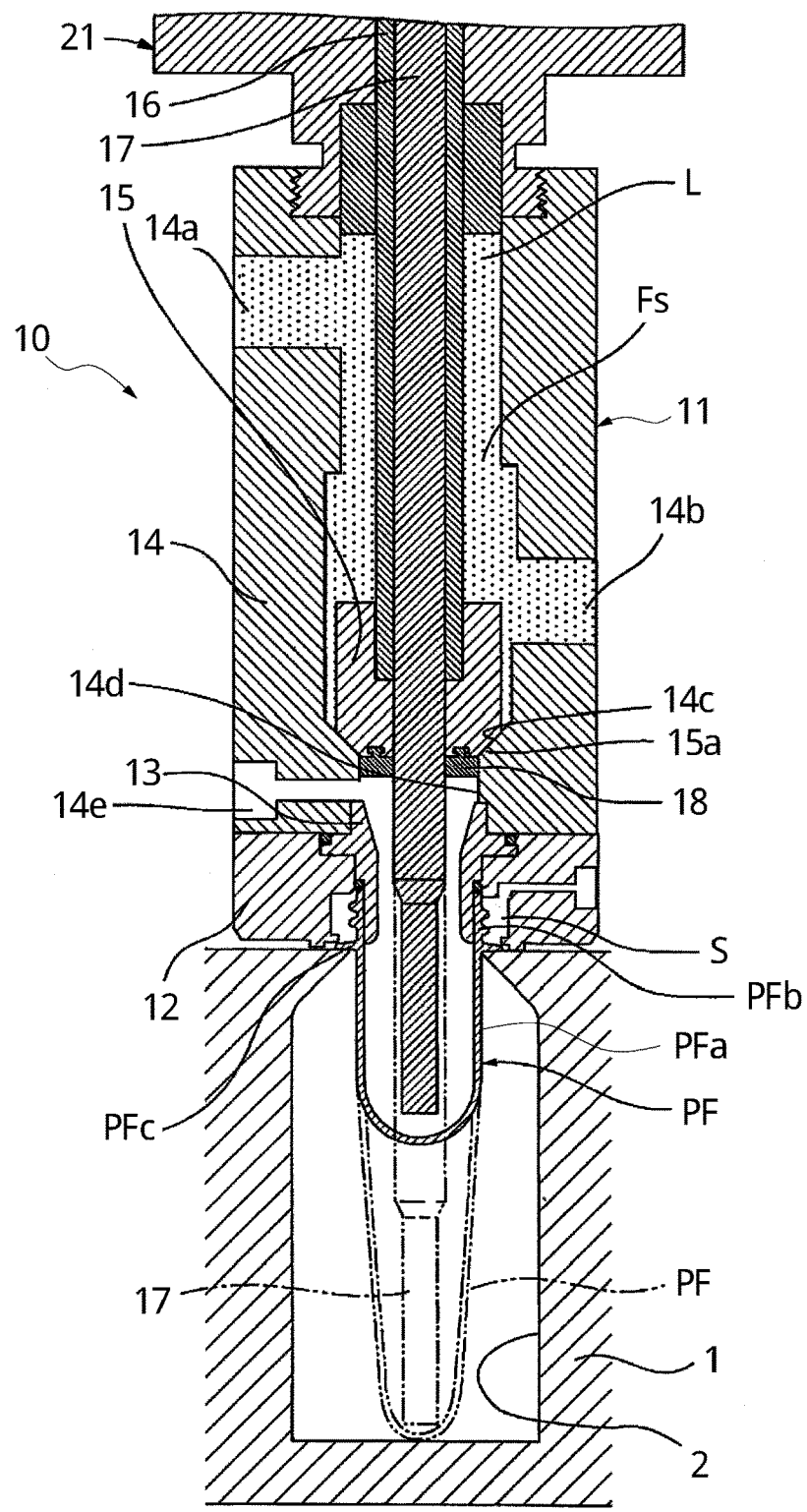
FIG. 2 is an enlarged sectional view of a filling head portion illustrated in FIG. 1.

As illustrated in FIGS. 1 and 2, a blow molding apparatus according to one of embodiments of the present disclosure includes a mold 1 used for blow molding. The mold 1 has a bottle-shaped cavity 2, and the mold 1 is open upward on an upper surface thereof. Although not illustrated in detail, the mold 1 may be opened into right and left mold halves, and a molded product may be removed from the mold 1 by opening the mold 1.

To the mold 1, a preform PF, which is to be blow molded into a bottle by using the blow molding apparatus, may be fitted. FIGS. 1 and 2 illustrate a state where the preform PF is fitted to the mold 1. As illustrated in FIG. 2, examples of the preform PF may include the one which is generally formed in a bottomed cylindrical shape by using a resin material, such as polypropylene (PP), which includes a cylindrical mouth tubular portion PFb provided integrally in an upper end of a main body portion PFa having a test tube shape, and which includes a neck ring PFc provided integrally in a lower end portion of the mouth tubular portion PFb. The preform PF is fitted to the mold 1, with the main body portion PFa being disposed within the cavity 2 of the mold 1 along the axis of the cavity 2, with the neck ring PFc abutting against the upper surface of the mold 1, and with the mouth tubular portion PFb protruding to the outside (upward in FIG. 1) of the mold 1.

As illustrated in FIG. 1, on an upper side of the mold 1, a nozzle unit 10 is provided in a manner such that the nozzle unit 10 is freely displaceable in upward and downward directions relative to the mold 1. The nozzle nit 10 generally has a tubular shape and includes a filling head portion 11 and a support portion 21 to which the filling head portion 11 is screw-connected detachably like a cartridge.

The filling head portion 11 includes a holding member 12, a blow nozzle 13, and a supply tubular portion 14.

The holding member 12 is formed in a block shape provided in the middle thereof with a through hole extending vertically, and the tubular blow nozzle 13 is fitted on the inner side of the through hole. When the nozzle unit 10 is displaced downward to the lower end, the mouth tubular portion PFb of the preform PF fitted to the mold 1 is located in the through hole with the blow nozzle 13 being fitted inside the mouth tubular portion PFb, and the neck ring PFc is sandwiched between the lower end of the holding member 12 and the upper surface of the mold 1, and thus, the preform PF is held in a fitted position that is perpendicular to the mold 1.

Between an outer circumferential surface of the mouth tubular portion PFb of the preform PF fitted to the mold 1 and an inner circumferential surface of the holding member 12, space S surrounding these members is defined and formed.

As illustrated in FIG. 2, the supply tubular portion 14 is formed as a cylindrical member provided inside thereof with a vertically extending supply path Fs and is fixed to an upper end of the holding member 12 so that the supply tubular portion 14, together with the holding member 12, is displaceable upward and downward relatively with respect to the mold 1. The supply tubular portion 14 is provided on an upper end side thereof with an introduction port 14a communicating with the supply path Fs and is also provided on a lower end side thereof with a discharge port 14b communicating with the supply path Fs. Furthermore, the supply tubular portion 14 is provided, in a lower end of an inner surface thereof that forms the supply path Fs, with a sealing surface 14c having a conical surface shape inclined with a diameter decreasing downward. In the axis of the sealing surface 14c, a supply hole 14d, through which the supply path Fs opens downward into communication with the blow nozzle 13, is also provided.

In the supply path Fs, a sealing body 15, configured to open and close the supply hole 14d, and thus, the blow nozzle 13, is disposed. The sealing body 15 is formed in a short cylindrical shape and provided, in an outer peripheral portion of a lower end surface thereof, with a tapered abutment surface 15a. The abutment surface 15a has the same inclination angle as that of the sealing surface 14c, so that the abutment surface 15a may closely contact the sealing surface 14c. In the supply path Fs, a shaft body 16 with a long and narrow cylindrical rod shape is disposed along the axis of the supply path Fs. The shaft body 16 extends through the upper end of the supply tubular portion 14 in a liquid-tight fashion and is supported by the support portion 21 in a manner such that the shaft body 16 is freely displaceable in upward and downward directions with respect to the filling head portion 11 and the support portion 21. The sealing body 15 is coaxially fixed to a lower end of the shaft body 16, and the sealing body 15, together with the shaft body 16, is freely displaceable upward and downward within the supply path Fs. When the shaft body 16 is displaced to the lowermost stroke limit, the abutment surface 15a of the sealing body 15 abuts against the sealing surface 14c provided in the lower end portion of the supply tubular portion 14. Thus, the supply hole 14d, and thus, the blow nozzle 13 are closed by the sealing body 15. On the other hand, when the sealing body 15, together with the shaft body 16, is displaced upward and when the abutment surface 15a of the sealing body 15 comes off the sealing surface 14c provided in the supply tubular portion 14, the supply hole 14d, and thus, the blow nozzle 13, are opened.

The shaft body 16 is hollow, and a stretching rod 17 is slidably fitted inside the shaft body 16. The stretching rod 17 is displaceable in the axis direction relatively with respect to the shaft body 16, and a lower end of the stretching rod 17 protrudes from a lower end of the sealing body 15. As represented by a two-dot chain line in FIG. 2, the stretching rod 17 may stretch the preform PF in the longitudinal (axial) direction by being displaced downward.

Additionally, in the lower end of the sealing body 15, a short cylindrical guiding body 18 made of polyetheretherketone (PEEK) resin is fixed to guide the stretching rod 17.

As illustrated in FIG. 1, a plunger pump 31 and a liquid circulation unit 32 are connected to the nozzle unit 10.

The plunger pump 31 includes a cylinder 31a and a plunger 31b fitted in the cylinder 31a in a manner such that the plunger 31b is displaceable along the axis direction. The plunger 31b is configured, when being actuated, to supply the pressurized liquid L into the supply path Fs from the introduction port 14a provided in the supply tubular portion 14 via a pipe P1. In the illustrated example, the plunger pump 31 is a servo plunger-type pump including an electric motor 31c as a driving source, and the plunger 31b is configured to be driven by the electric motor 31c and actuated in the axis direction in the cylinder 31a.

To the electric motor 31c, a control device 33 as a controller is connected, and the control device 33 controls actuation of the electric motor 31c. The control device 33 controls the electric motor 31c to actuate and also controls a rotation rate (the number of rotations per unit time) and torque of the electric motor 31c to be changed to various values. That is to say, by controlling the rotation rate and torque of the electric motor 31c, the control device 33 is capable of driving the plunger 31b at any actuation rate and an actuation force. The control device 33 may also be configured to perform control in cooperation with a control system that controls movement of the sealing body 15 and the stretching rod 17 included in the blow molding apparatus or configured as a component of the control system.

The liquid circulation unit 32 has the functions of regulating the liquid L to a predetermined temperature and supplying the liquid L to the plunger pump 31 through a pipe R2 while replenishing additional liquid L through a pipe R1 and of circulating the liquid L between the plunger pump 31 and the supply path Fs while regulating the liquid L to a predetermined temperature. That is to say, the liquid L may be circulated around a circulation path CR formed along the supply path Fs→discharge port 14b→pipe R3→liquid circulation unit 32→pipe R2→plunger pump 31→pipe P1→introduction port 14a→supply path Fs, as needed.

Two electromagnetic valves V1 and V2 are disposed in the circulation path CR, and predetermined flow paths are opened and closed by the corresponding valves V1 and V2 in accordance with processes in blow molding.

The supply tubular portion 14 is provided with a connection port 14e communicating with the blow nozzle 13 via the supply hole 14d. To the connection port 14e, a deaeration mechanism configured to suck out air that is present within the preform PF prior to blow molding, a mechanism configured to dispel the liquid remaining within the connection port 14e by supplying low-pressure air into the connection port 14e momentarily, or the like may be connected.

When the sealing body 15 is displaced upward to open the supply hole 14d, and thus, the blow nozzle 13 while the plunger pump 31 is in actuation, the pressurized liquid L is supplied from the plunger pump 31 to the blow nozzle 13 via the supply path Fs. In this way, the pressurized liquid L is supplied (filled) into the preform PF through the blow nozzle 13, and the preform PF is blow molded into a shape conforming to the cavity 2 of the mold 1.

Herein, when the sealing body 15 is displaced upward to start its opening movement, the control device 33 controls the electric motor 31c to actuate at a predetermined rotation rate and torque to start the supply of the pressurized liquid L from the plunger pump 31 into the preform PF.

Upon an elapse of a predetermined time period from the start of the supply of the pressurized liquid L into the preform PF, the control device 33 also changes the rotation rate and torque of the electric motor 31c to values that are lower than those before the elapse of the predetermined time period. That is to say, the control device 33 controls the electric motor 31c to actuate at a constant rotation rate and torque until the predetermined time period elapses from the start of the supply of the pressurized liquid L into the preform PF, and upon the elapse of the predetermined time period from the start of the supply of the pressurized liquid L into the preform PF, the control device 33 changes the rotation rate and torque of the electric motor 31c to values that are lower than those used until then. Thus, by changing, upon the elapse of the predetermined time period from the start of the supply of the pressurized liquid L into the preform PF, the rotation rate and torque of the electric motor 31c to values that are lower than those used until then, the control device 33 regulates the peak pressure of the liquid L supplied into the preform PF to be from 3.5 MPa to 5.0 MPa.

A pressure of the liquid L to be supplied into the preform PF may be measured by, for example, a pressure gauge mounted in the blow nozzle 13 or the supply hole 14d.

Figure 3:
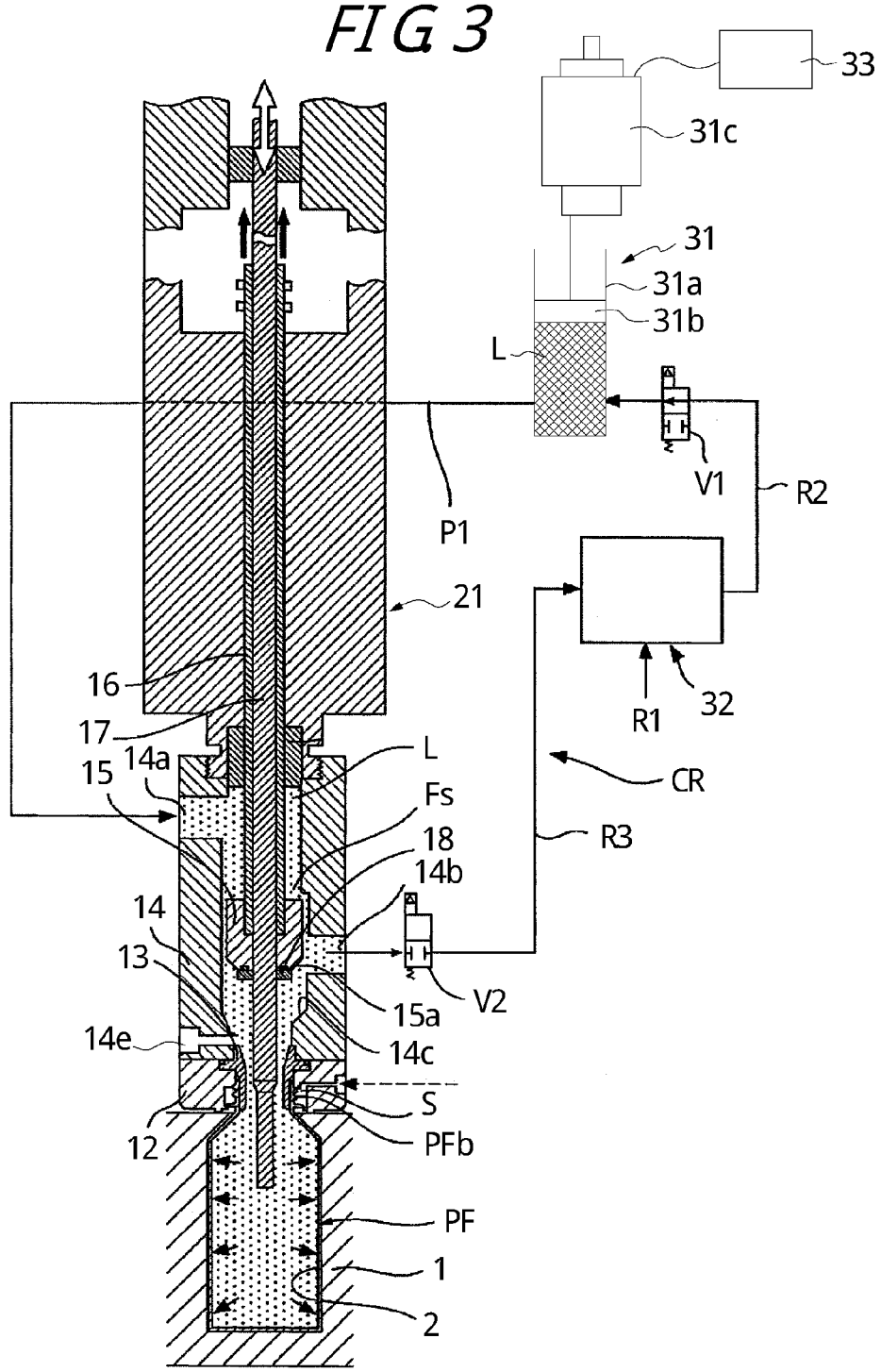
FIG. 3 illustrates a state where a preform is blow molded by a blow molding apparatus illustrated in FIG. 1.
Figure 4:
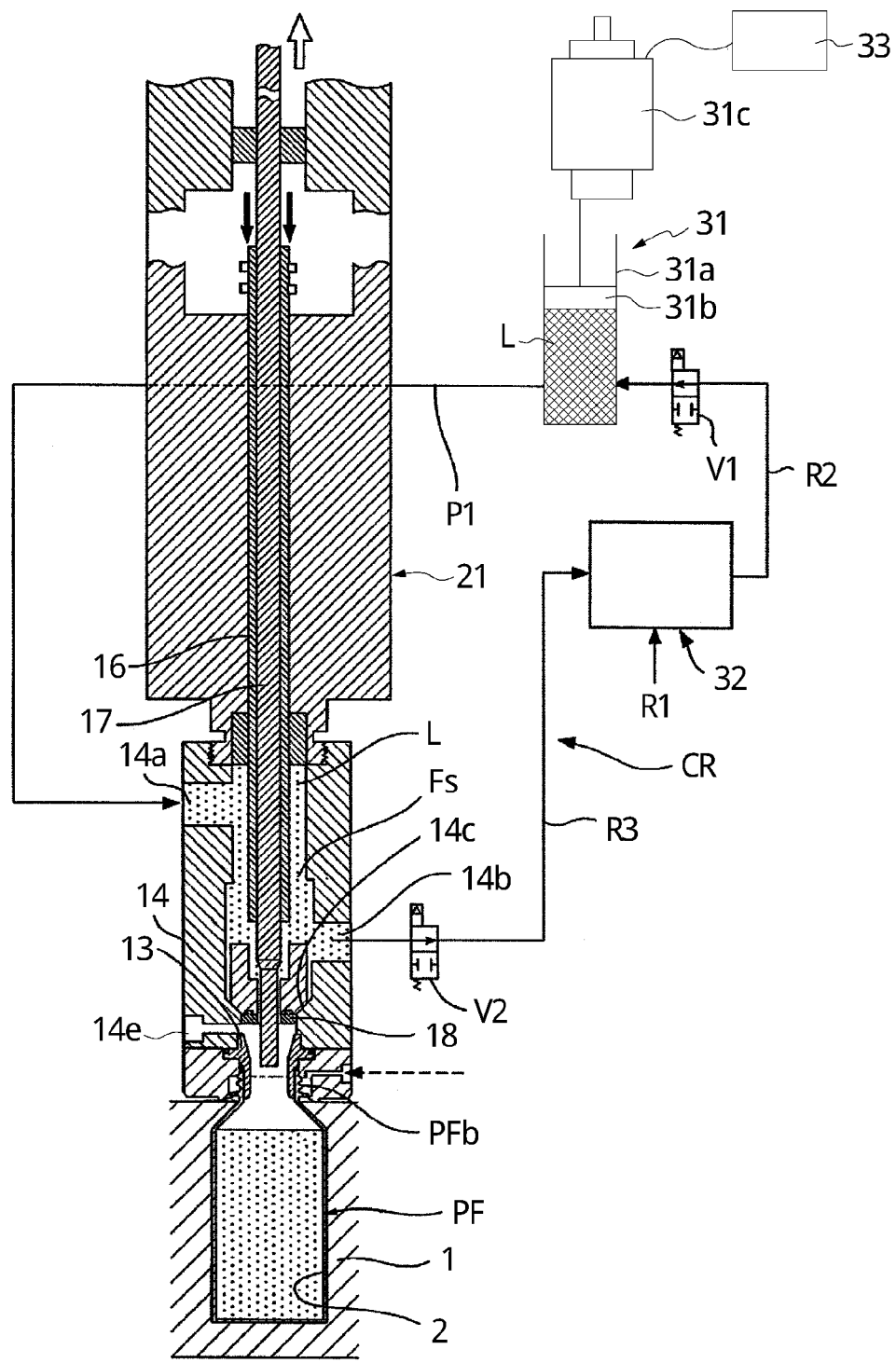
FIG. 4 illustrates a state where blow molding by a blow molding apparatus illustrated in FIG. 1 is completed.
Figure 5:
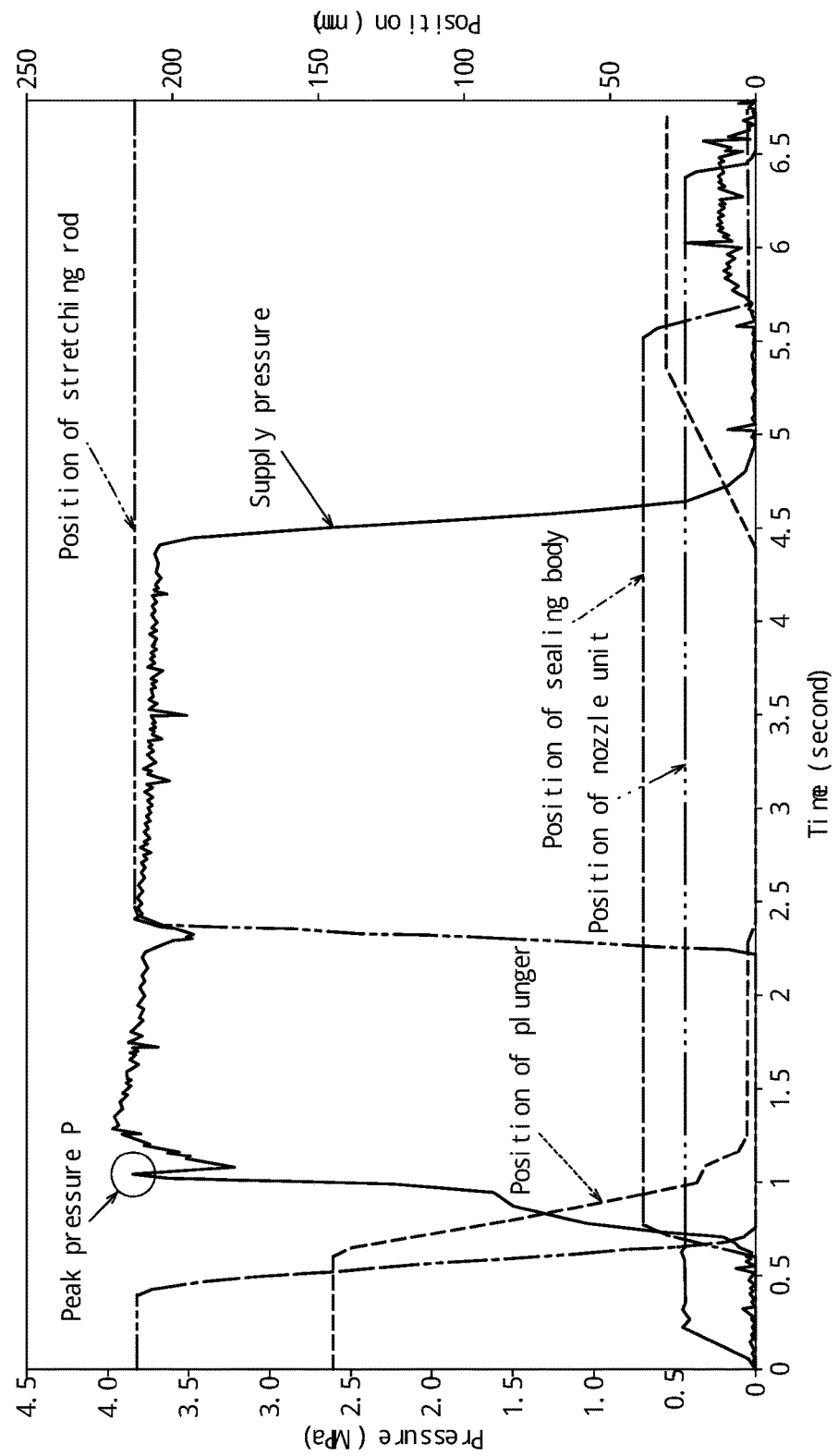
FIG. 5 is a time chart illustrating a procedure of blow molding using a blow molding apparatus illustrated in FIG. 1.

FIG. 3 illustrates a state where a preform is blow molded by a blow molding apparatus illustrated in FIG. 1, and FIG. 4 illustrates a state where blow molding by a blow molding apparatus illustrated in FIG. 1 is completed. FIG. 5 is a time chart illustrating a procedure of blow molding using a blow molding apparatus illustrated in FIG. 1.

The following describes a procedure of forming a bottle by blow molding the preform PF by using such a blow molding apparatus, namely, a blow molding method according to the present disclosure, with reference to FIGS. 1 to 5 as needed.

Firstly, the preform PF which, except for the mouth tubular portion PFb, is heated to a temperature suitable for blow molding is fitted to the mold 1 used for blow molding, with the mouth tubular portion PFb being protruded upward, and mold closing is performed.

Secondly, the nozzle unit 10 is displaced downward (as represented by a three-dot chain line in FIG. 5) so that the neck ring PFc is sandwiched between the holding member 12 and the upper surface of the mold 1 and that the preform PF is held to the mold 1. At this time, the supply hole 14*d* is in its closed state by the sealing body 15, and each of the valves V1 and V2 disposed in the circulation path CR is in its opened state, and the liquid L is being circulated around the circulation path CR while being regulated to a predetermined temperature by the liquid circulation unit 32. This state is illustrated in FIG. 1.

Thirdly, as represented by the two-dot chain line in FIG. 2, the stretching rod 17 is displaced downward (as represented by a two-dot chain line in FIG. 5), so that the stretching rod 17 stretches the preform PF in the longitudinal (axial) direction.

Then, while the preform PF is stretched in the longitudinal (axial) direction by the stretching rod 17, the valves V1 and V2 are closed to stop the circulation of the liquid L around the circulation path CR, and as illustrated in FIG. 3, the sealing body 15, together with the shaft body 16, is displaced upward to open the supply hole 14*d*, and thus, the blow nozzle 13 (as represented by a single-dot chain line in FIG. 5). Furthermore, once the sealing body 15 starts the opening movement, the control device 33 controls the electric motor 31*c* to be activated, which in turn causes the plunger 31*b* to start to actuate (as represented by a dash line in FIG. 5). Consequently, the pressurized liquid L pumped from the plunger pump 31 is supplied into the preform PF through the supply hole 14*d* and the blow nozzle 13 (the liquid supply step) for blow molding.

At this time, as can be seen from FIG. 5, the control device 33 controls the electric motor 31*c* to actuate at a constant rotation rate and torque to thereby actuate the plunger 31*b* at a constant actuation rate and actuation force until the predetermined time period (which is approximately 0.5 second in the example illustrated in FIG. 5) elapses from the start of the supply of the pressurized liquid L into the preform PF. Note that the sealing body 15 is brought into a fully opened state before the elapse of the predetermined time period.

Furthermore, upon the elapse of the predetermined time period from the start of the supply of the pressurized liquid L into the preform PF, the control device 33 changes the rotation rate and torque of the electric motor 31*c* to values that are lower than those used until then. The changes are made before the supply of the liquid L into the preform PF is completed. With the above control, the control device 33 reduces the actuation rate and the actuation force of the plunger 31*b* and controls the supply pressure P of the liquid L supplied into the preform PF (the peak pressure control step). That is to say, by reducing, upon the elapse of the predetermined time period after the start of the supply of the pressurized liquid L into the preform PF, the actuation rate and the actuation force of the plunger 31*b*, the control device 33 supplies the liquid L into the preform PF at a supply pressure P that is lower than that used in the beginning of the supply. The reduction in the actuation rate and the actuation force of the plunger 31*b* upon the elapse of the predetermined time period after the start of the supply of the pressurized liquid L into the preform PF is indicated by the fact an inclination angle of the dash line, which indicates the position of the plunger 31*b*, is changed after the elapse of the predetermined time period in FIG. 5.

By thus increasing the actuation rate and the actuation force of the plunger pump 31, that is to say, the plunger 31*b*, in the beginning of the supply of the pressurized liquid L in supplying the pressurized liquid L into the preform PF, the liquid L supplied into the preform PF is pressurized to the prescribed supply pressure P in a short period of time, and moldability of the preform PF may be enhanced. Furthermore, by supplying the liquid L into the preform PF at a supply pressure P that is lower than that used in the beginning of the supply by reducing the actuation rate and the actuation force of the plunger 31*b* upon the elapse of the predetermined time period after the start of the supply of the pressurized liquid L, occurrence of the water hammer phenomenon during the supply of the pressurized liquid L into the preform PF is prevented while pressurization of the liquid L supplied into the preform PF is accelerated, and the peak pressure of the liquid L supplied into the preform PF is regulated to be from 3.5 MPa to 5.0 MPa.

Upon the elapse of the predetermined time period after the start of the supply of the pressurized liquid L, the liquid L is supplied into the preform PF at a supply pressure P that is lower than that used in the beginning of the supply, and then, when a prescribed amount of the liquid L is supplied into the preform PF, actuation of the plunger 31*b* is halted, and this state is retained with the sealing body 15 remaining opened until a predetermined retention time period elapses.

During the retention time period, the stretching rod 17 is displaced upward and withdrawn out of the preform PF, and to compensate the reduced amount of the liquid L corresponding to the volume of the withdrawn stretching rod 17, the liquid L is supplied into the preform PF by actuation of the plunger pump 31.

Additionally, as needed, the suck back process of actuating the plunger 31*b* in the return direction to suck in the liquid L through the supply hole 14*d* a may also be performed to regulate the amount of the liquid L to be filled. In FIG. 5, the suck back process is started when the plunger 31*b* is actuated to return after 4.4 seconds from the start of the procedure of the blow molding.

By blow molding as described above, the preform PF is expanded and stretched in the lateral (radial) direction by using the pressure of the liquid L supplied by the plunger pump 31 and is molded into a bottle having a shape conforming to the cavity 2 of the mold 1.

Additionally, in cases where the mouth tubular portion PFb undergoes diameter increase and deformation due to the pressure of the liquid L during blow molding, pressurized air may be supplied to space S defined between the holding member 12 and the mouth tubular portion PFb through a pressurizing flow path which is not illustrated. By doing so, the diameter increase and deformation are prevented effectively.

Once blow molding is completed, then, as illustrated in FIG. 4, the supply hole 14*d*, and thus, the blow nozzle 13 are closed by displacing the sealing body 15, together with the shaft body 16, downward, and each of the valves V1 and V2 is brought into its opened state to restart the circulation of the liquid L around the circulation path CR. In the example illustrated in FIG. 5, the sealing body 15 is closed after 5.5 seconds from the start of the procedure when the suck back process ends. After 6.4 seconds from the start of the procedure, the nozzle unit 10 is displaced upward, and a mouth tubular portion of the bottle resulting from blow molding of the preform PF is detached from the blow nozzle 13. Then, the mold 1 is opened to remove the liquid L filled bottle, and the mouth tubular portion of the bottle is sealed with a cap or the like. Thus, a final product of the bottle containing the liquid L as the content liquid is completed.

FIG. 6 illustrates comparison between a time chart of a blow molding apparatus illustrated in FIG. 1 and a time chart of a blow molding apparatus of Comparative Example.

As illustrated in the time chart on the lower side in FIG. 6, in the blow molding apparatus (blow molding method) of Comparative Example in which the pressurized liquid L is supplied into the preform PF while the actuation rate and the actuation force of the plunger 31b are maintained constant from the start of the supply of the pressurized liquid L into the preform PF to completion of the supply of the liquid L, the actuation rate of the plunger 31b is slowed down to one-third the actuation rate used in the blow molding apparatus (blow molding method) of the present disclosure illustrated in the time chart on the upper side in FIG. 6, to prevent an excessive surge in peak pressure of the supply pressure P of the liquid L caused by water hammer. This leads to a prolonged blow molding cycle and an increased manufacturing cost of the product.

In contrast, according to the present disclosure, by supplying the liquid L into the preform PF at a supply pressure P that is lower than that used in the beginning of the supply by reducing the actuation rate and the actuation force of the plunger 31b upon the elapse of the predetermined time period after the start of the supply of the pressurized liquid L into the preform PF as described above, the actuation rate and the actuation force of the plunger pump 31 are increased in the beginning of the supply of the pressurized liquid L into the preform PF. Accordingly, occurrence of water hammer (fluid hammer effect) during the supply of the pressurized liquid L into the preform PF is prevented while pressurization of the liquid L supplied into the preform PF is accelerated, and the peak pressure of the liquid L supplied into the preform PF is regulated to be from 3.5 MPa to 5.0 MPa. This leads to a shortened blow molding cycle and a reduced manufacturing cost of the product, and moreover, moldability of the preform PF is enhanced, and the preform PF is blow molded into a predetermined shape stably with high precision.

Furthermore, according to the present disclosure, by changing the actuation rate and the actuation force of the plunger pump 31 during the supply of the pressurized liquid L into the preform PF, an excessive surge in peak pressure of the liquid L caused by water hammer is prevented, and the peak pressure of the liquid L supplied into the preform PF is regulated to be from 3.5 MPa to 5.0 MPa. Accordingly, while pressurization of the liquid L supplied into the preform PF is accelerated, the water hammer phenomenon occurring in reaction thereto is prevented, and thus, moldability of the preform PF and stability of blow molding are enhanced.

Moreover, the prevention of the water hammer phenomenon according to the present disclosure described above controls the peak pressure of the liquid L to be within the withstanding pressure range of the blow molding apparatus, thereby preventing occurrence of leakage of the like due to a crevice that would otherwise be created between the nozzle unit 10 and the mold 1 during blow molding.

Figure 7:
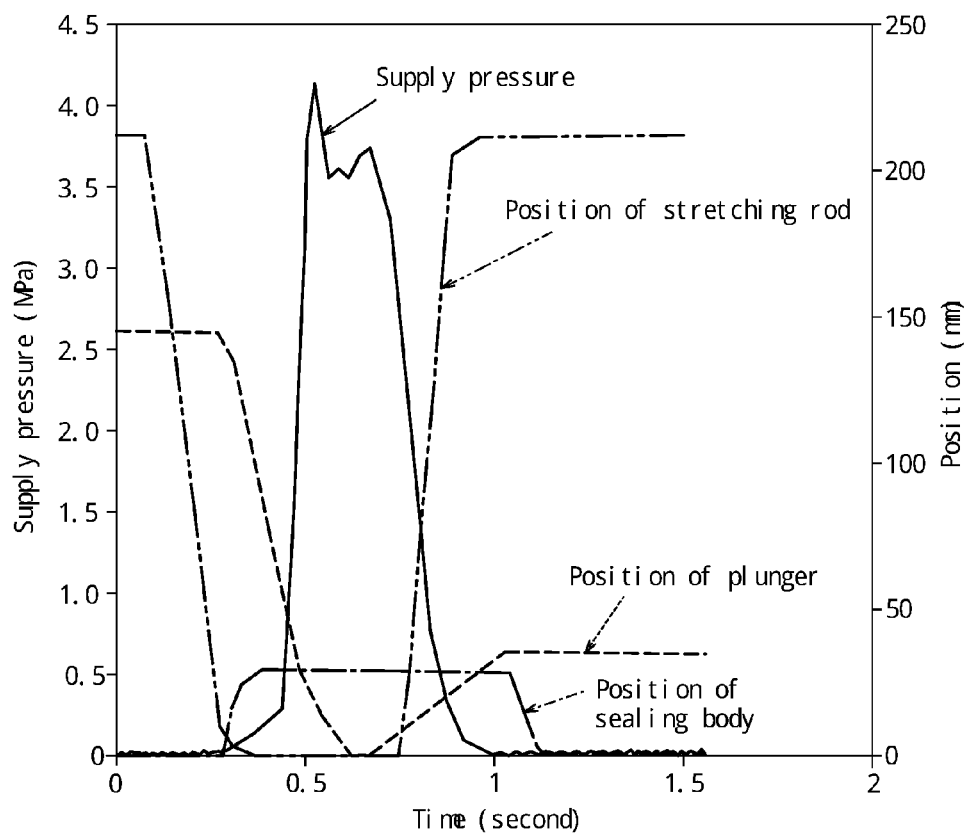
FIG. 7 is a time chart illustrating a modification of a procedure of blow molding illustrated in FIG. 5 in which a retention time period is reduced.

FIG. 7 is a time chart illustrating a modification of a procedure of blow molding illustrated in FIG. 5 in which a retention time period is reduced.

Since, according to the present disclosure, moldability of the preform is enhanced by accelerating pressurization of the liquid L supplied into the preform PF while preventing occurrence of the water hammer phenomenon during the supply of the pressurized liquid L into the preform PF, the retention time period may be reduced compared with the example illustrated in the time chart of blow molding in FIG. 5. This leads to an even more shortened blow molding cycle and an even more reduced manufacturing cost of the product.

EXAMPLES

A description is given below of Examples of a blow molding apparatus (blow molding method) of the present disclosure. However, the present disclosure is not limited to the following Examples.

As Examples, three Examples 1 to 3 were prepared by varying a time period (a time period before a change) from a start of a supply of a pressurized liquid into a preform to when a rotation rate and torque of a servo motor (electric motor) (the torque being called plunger torque) were changed. The above time period is set to 0.228 second in Example 1, 0.222 second in Example 2, and 0.241 second in Example 3.

In each of Examples 1 to 3, the rate of the servo motor and the plunger torque, used from the start of the supply of the pressurized liquid into the preform until the corresponding predetermined time period elapses, are the same 3000 rpm and 45 Nm, respectively. In each of Examples 1 to 3, the rate of the servo motor and the plunger torque, used after the elapse of the corresponding predetermined time period from the start of the supply of the pressurized liquid into the preform, are the same 1250 rpm and 36.9 Nm, respectively.

Comparative Examples 1 to 5, to be compared with Examples 1 to 3, were also prepared. In each of Comparison Examples 1 to 3, a time period from the start of the supply of the pressurized liquid into the preform to when the rotation rate of the servo motor and the plunger torque are changed is set to be shorter than the time periods set in Examples 1 to 3, and this time period is set to 0.205 second in Example 1, 0.180 second in Example 2, and 0.170 second in Example 3. The remaining conditions, that is to say, the rate of the servo motor and the plunger torque, used from the start of the supply of the pressurized liquid into the preform until the corresponding predetermined time period elapses, the rate of the servo motor and the plunger torque, used after the elapse of the corresponding predetermined time period from the start of the supply of the pressurized liquid into the preform, and a pressurization time period for which the liquid is pressurized, are the same as those used in Examples 1 to 3.

On the other hand, in each of Comparison Examples 4 and 5, the rate of the servo motor and the plunger torque are maintained constant without any change from the start of the supply of the pressurized liquid into the preform until completion of the supply of the liquid. In Comparison Example 4, the rate of the servo motor is set to 1250 rpm, and the torque of the servo motor (plunger torque) is set to 36.9 Nm, and in Comparison Example 5, the rate of the servo motor is set to 3000 rpm, and the torque of the servo motor (plunger torque) is set to 45 Nm.

Preforms were blow molded under the aforementioned conditions of Examples 1 to 3 and Comparison Examples 1 to 5, and comparison was made then in terms of a peak pressure (MPa) of the liquid, a bottle capacity (ml) immediately after blow molding, a bottle capacity (ml) after an elapse of one day from blow molding, and a shrinkage rate (%) between the bottle capacity immediately after blow molding and the bottle capacity after the elapse of one day from blow molding. FIG. 8 shows comparison results.

As can be seen clearly from the comparison results, blow molding a preform under the conditions of Examples 1 to 3 allows rapid blow molding of the preform by increasing the supply pressure of the liquid to an appropriate pressure within a short pressurization time period of 0.27 second while maintaining the peak pressure of the liquid to be from 3.5 MPa to 5.0 MPa without causing an excessive surge. Accordingly, Examples 1 to 3 have been found to offer a shortened blow molding cycle and a reduced manufacturing cost of the product.

Figure 9:
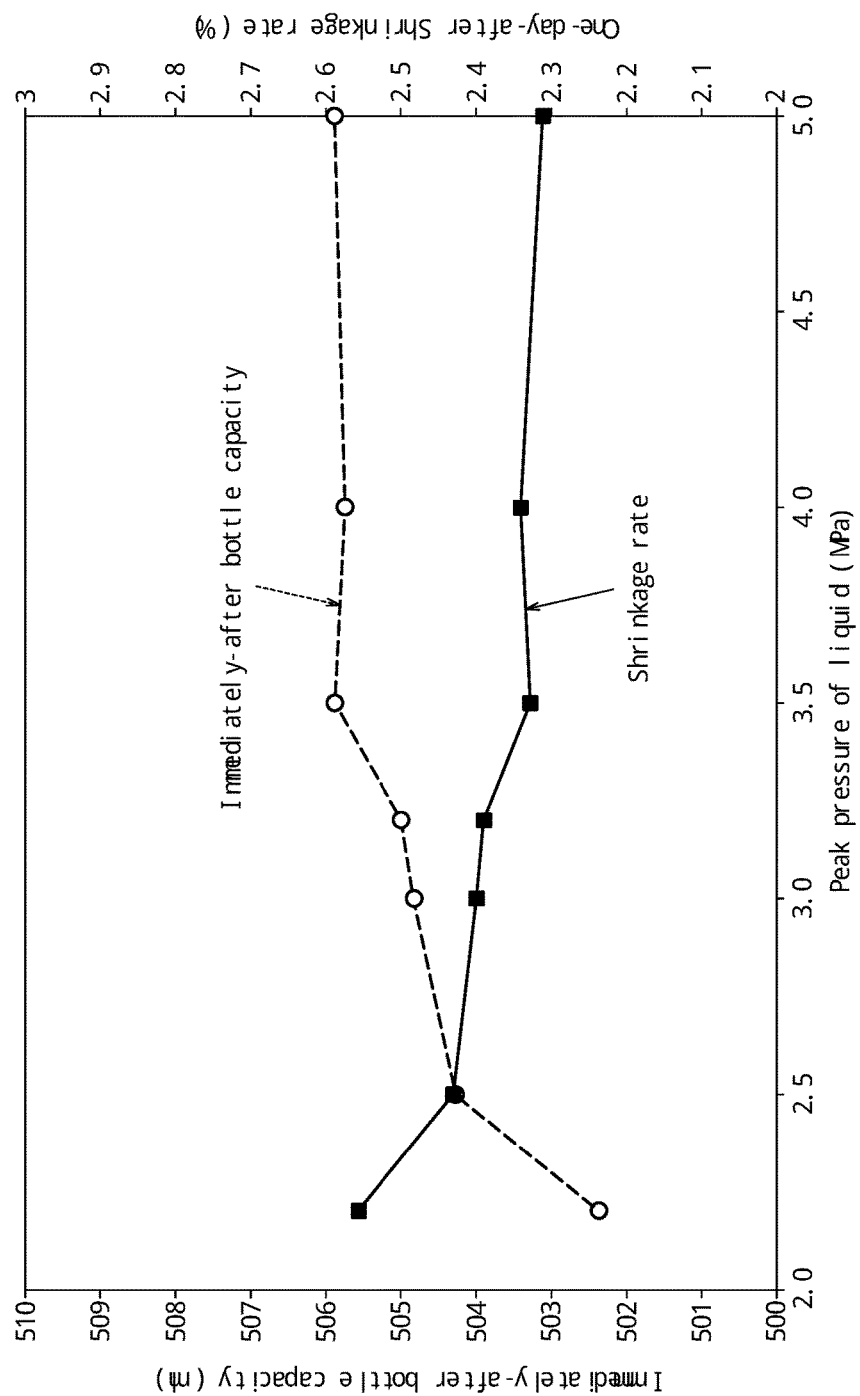
FIG. 9 is a characteristic line diagram illustrating a relation between a peak pressure of liquid during blow molding, and a bottle capacity and a shrinkage rate of the bottle capacity.

Furthermore, as can be seen clearly from the comparison results, blow molding a preform under any of the conditions of Examples 1 to 3 provides a small shrinkage rate of 2.3% of the bottle capacity after the elapse of one day from blow molding with respect to the bottle capacity immediately after blow molding. That is to say, as illustrated in FIG. 9, when the peak pressure of the liquid supplied into the preform during blow molding is in the range from 3.5 MPa to 5.0 MPa, the bottle capacity immediately after blow molding is larger compared to that obtained when the peak pressure is in the lower range, and this accounts for a small shrinkage rate of 2.3% of the bottle capacity after the elapse of one day from blow molding with respect to the bottle capacity immediately after blow molding. Thus, as can be seen in Examples 1 to 3, by regulating the peak pressure of the liquid during blow molding to be in the range from 3.5 MPa to 5.0 MPa, moldability of the preform at an early stage of pressurization of the liquid is enhanced, and the preform is blow molded into a predetermined shape stably.

In contrast, each of Comparison Examples 1 to 3, in which the corresponding time period from the start of the supply of the pressurized liquid into the preform to when the rotation rate of the servo motor and the plunger torque are changed is set to be shorter than the time periods in Examples 1 to 3, exhibits a smaller peak pressure of the liquid of from 2.2 MPa to 3.0 MPa during blow molding. Consequently, Comparison Examples 1 to 3 exhibit larger shrinkage rates of from 2.4% to 2.6% compared with Examples 1 to 3. As illustrated in FIG. 9, when the peak pressure is in the range from 2.2 MPa to 3.0 MPa as in Comparative Examples 1 to 3, the bottle capacity immediately after blow molding is smaller compared to that obtained when the peak pressure is in the higher range. This demonstrates that, in Comparison Examples 1 to 3, moldability of the preform at an early stage of pressurization of the liquid is not satisfactorily enhanced, and blow molding of the preform is unstabilized.

On the other hand, in Comparison Example 4, the peak pressure of the liquid during blow molding is 4.0 MPa, which equals the peak pressure in Examples 1 to 3. However, the pressurization time period is 1.0 second, which is almost 4 times longer than the pressurization time period in Examples 1 to 3. Consequently, in Comparison Example 4, the bottle capacity immediately after blow molding is decreased significantly. Accordingly, Comparison Example 4 exhibits a shrinkage rate of the bottle capacity of 6.1%, which is significantly larger than a shrinkage rate of 2.3% in Examples 1 to 3. This demonstrates that, in Comparison Example 4, since the liquid is pressurized slowly, moldability of the preform at an early stage of pressurization of the liquid is not satisfactorily enhanced, and blow molding of the preform is unstabilized.

Comparison Example 5, in which the rate of the servo motor and the plunger torque are increased compared with Comparison Example 4, exhibits a pressurization time period of 0.25 second, which is substantially the same as the pressurization time period in Examples 1 to 3. However, the peak pressure of the liquid during blow molding is as high as 10.0 MPa or more. Accordingly, in Comparison Example 5, the mold was mechanically opened, or the preform was damaged during blow molding, and blow molding was not completed. An immediately-after bottle capacity (bottle capacity immediately after blow molding), a one-day-after bottle capacity (bottle capacity after the elapse of one day from blow molding), and a shrinkage rate were not obtained. This demonstrates that, an attempt to reduce the pressurization time period of the liquid by setting high rate of the servo motor and plunger torque, when, as in Comparison Example 5, the rate of the servo motor and the plunger torque are maintained constant without any change from the start of the supply of the pressurized liquid into the preform until completion of the supply of the liquid causes an excessive surge in peak pressure of the liquid and hinders stable blow molding of the preform.

Needless to say, the present disclosure is not limited to the above embodiment, and various changes may be made without departing the gist of the present disclosure.

For example, in the above embodiment, upon an elapse of a predetermined time period from the start of the supply of the pressurized liquid into the preform, the control device 33 changes the actuation rate and the actuation force of the plunger pump 31 (plunger 31*b*) to values that are lower than those before the elapse of the predetermined time period. However, the present disclosure is not limited to the above embodiment, and the actuation rate and the actuation force of the plunger pump 31 may also be changed in various patterns, by which the actuation rate and the actuation force of the plunger pump 31 may be changed to regulate the peak pressure of the liquid L supplied into the preform PF to be from 3.5 MPa to 5.0 MPa during the supply of the pressurized liquid L into the preform PF. For example, the actuation rate and the actuation force of the plunger pump 31 may be changed stepwise, or continuously and gradually, during the supply of the pressurized liquid L into the preform PF.

Furthermore, although in the above embodiment the plunger pump 31 is a servo plunger-type pump including the plunger 31*b* driven by the electric motor 31*c*, the present disclosure is not limited to the above embodiment, and the plunger 31*b* may also be configured to be driven by any other driving mechanism, such as a hydraulic cylinder and an air cylinder, with which the actuation rate and the actuation force of the plunger 31*b* may be changed at will.

Moreover, although in the above embodiment the liquid L is circulated around the circulation path CR, the present disclosure is not limited to the above embodiment, and the liquid L does not need to be circulated as long as the pressurized liquid L may be supplied from the plunger pump 31 into the preform PF through the blow nozzle 13.

Moreover, although in the above embodiment the sealing body 15 is opened to supply the pressurized liquid L into the preform PF in the process of longitudinal stretching, the supply of the pressurized liquid L into the preform PF may also be started with the start of longitudinal stretching using the stretching rod 17 or after completion of longitudinal stretching using the stretching rod 17.

Additionally, the preform PF may be expanded and stretched in both the longitudinal (axial) and the lateral (radial) direction into a bottle having a shape conforming to the cavity 2 of the mold 1 by using only the pressure caused by the liquid L supplied by the plunger pump 31 without using the stretching rod 17.

Moreover, as the preform PF, the one with a shape including the main body portion PFa and the mouth tubular portion PFb and not including the neck ring PFc may also be used. Moreover, the material of the preform PF is not limited to polypropylene, and another resin material may also be used.

REFERENCE SIGNS LIST

1 Mold
2 Cavity
10 Nozzle unit
11 Filling head portion
12 Holding member
13 Blow nozzle
14 Supply tubular portion
14a Introduction port
14b Discharge port
14c Sealing surface
14d Supply hole
14e Connection port
15 Sealing body
15a Abutment surface
16 Shaft body
17 Stretching rod
18 Guiding body
21 Support portion
31 Plunger pump
31a Cylinder
31b Plunger
31c Electric motor
32 Liquid circulation unit
33 Control device (controller)
PF Preform
PFa Main body portion
PFb Mouth tubular portion
PFc Neck ring
S Space
Fs Supply path
P1 Pipe
L Liquid
R1 Pipe
R2 Pipe
R3 Pipe
CR Circulation path
V1, V2 Valve

The invention claimed is:

1. A blow molding method of supplying a pressurized liquid into a bottomed tubular preform fitted to a mold used for blow molding and molding the preform into a shape conforming to a cavity of the mold, the blow molding method comprising:

a liquid supply step of supplying a pressurized liquid into the preform through a blow nozzle fitted to a mouth tubular portion of the preform by using a plunger pump; and a peak pressure control step of changing an actuation rate and an actuation force of the plunger pump during the supply of the pressurized liquid into the preform to regulate a peak pressure of the liquid supplied into the preform to be from 3.5 MPa to 5.0 MPa, wherein, in the peak pressure control step, upon an elapse of a predetermined time period from a start of the supply of the pressurized liquid into the preform, the actuation rate and the actuation force of the plunger pump are changed to values that are lower than those before the elapse of the predetermined time period so as to lower a pressure of the pressurized liquid supplied into the preform, and wherein the predetermined time period from a start of a supply of a pressurized liquid into the preform to when the actuation rate and the actuation force of the plunger pump are changed is between 0.228 seconds and 0.5 seconds.

2. The blow molding method of claim 1, wherein the plunger pump is configured to be driven by an electric motor as a driving source, and the controller changes the actuation rate and the actuation force of the plunger pump by varying a rotation rate and torque of the electric motor.

3. The blow molding method of claim 1, further comprising providing a sealing body configured to open and close the blow nozzle, wherein the pressurized liquid is started to be supplied from the plunger pump into the preform upon a start of an opening movement of the sealing body.

4. The blow molding method of claim 1, further comprising providing a sealing body configured to open and close the blow nozzle, wherein the pressurized liquid is started to be supplied from the plunger pump into the preform upon a start of an opening movement of the sealing body.

5. The blow molding method of claim 1, wherein the plunger pump is configured to be driven by an electric motor as a driving source, and the controller changes the actuation rate and the actuation force of the plunger pump by varying a rotation rate and torque of the electric motor, and wherein the rotation rate of the electric motor is changed from 3000 rpm to 1250 rpm after the elapse of the predetermined time period.

6. The blow molding method of claim 1, wherein the plunger pump is configured to be driven by an electric motor as a driving source, and the controller changes the actuation rate and the actuation force of the plunger pump by varying a rotation rate and torque of the electric motor, and wherein the torque of the electric motor is changed from 45 N·m to 36.9 N·m after the elapse of the predetermined time period.

7. The blow molding method of claim 1, wherein the preform is expanded and stretched in a lateral direction by the pressure of the pressurized liquid supplied by the plunger pump.

8. The blow molding method of claim 1, wherein the preform is expanded and stretched in both a longitudinal and a lateral direction into a shape conforming to the cavity of the mold by using only pressure caused by the pressurized liquid supplied by the plunger pump and without using a stretching rod.

* * * * *